(12) United States Patent
Jablonski

(10) Patent No.: US 9,751,380 B2
(45) Date of Patent: Sep. 5, 2017

(54) AIR VENT ASSEMBLY WITH INTEGRAL AIR VENT AND CONTROL HEAD

(71) Applicant: GM GLOBAL TECHNOLOGY OPERATIONS LLC, Detroit, MI (US)

(72) Inventor: Robert C. Jablonski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 14/574,466

(22) Filed: Dec. 18, 2014

(65) Prior Publication Data

US 2016/0176264 A1 Jun. 23, 2016

(51) Int. Cl.
*B60H 1/00* (2006.01)
*B60H 1/34* (2006.01)

(52) U.S. Cl.
CPC ....... *B60H 1/0065* (2013.01); *B60H 1/00985* (2013.01); *B60H 1/3421* (2013.01)

(58) Field of Classification Search
CPC . B60H 1/0065; B60H 1/3421; B60H 1/00985
See application file for complete search history.

(56) References Cited

U.S. PATENT DOCUMENTS

| | | | | |
|---|---|---|---|---|
| 4,858,518 A * | 8/1989 | Yamaguchi | ......... | B60H 1/0065 237/12.3 A |
| 4,994,635 A * | 2/1991 | Cummings | ......... | H01H 3/0206 137/596 |
| 6,009,355 A * | 12/1999 | Obradovich | ....... | B60G 17/0195 340/815.4 |
| 2010/0029191 A1* | 2/2010 | Arndt | ...................... | B60H 1/34 454/154 |
| 2012/0184195 A1* | 7/2012 | Browne | ............... | B60H 1/3421 454/75 |
| 2014/0116181 A1* | 5/2014 | Yamada | ............... | B60H 1/0065 74/480 R |
| 2014/0318308 A1* | 10/2014 | Puskar, Jr. | ............... | G05G 1/10 74/553 |
| 2015/0031278 A1* | 1/2015 | Kim | .................... | B60H 1/3421 454/152 |

* cited by examiner

*Primary Examiner* — Len Tran
*Assistant Examiner* — Claire Rojohn, III
(74) *Attorney, Agent, or Firm* — Quinn IP Law

(57) ABSTRACT

An air vent assembly for use with a vehicle having a heating, ventilation, and air conditioning (HVAC) system and a controller includes an air vent and an HVAC control head. The control head partially or fully surrounds the air vent and includes HVAC setting selection mechanisms. Activation of a respective one of the selection mechanisms causes a desired setting of the HVAC system to be communicated to the controller to request a particular control setting of the HVAC system. The control head may include a bezel adjacent to the selection mechanisms and display screens which flank the vent. The control head may be a touch screen device having a touch control surface, and may be operable for displaying the HVAC setting selection mechanisms via the touch control surface. A vehicle includes a body defining a vehicle interior, the air circulation device, the controller, and the air vent assembly.

13 Claims, 2 Drawing Sheets

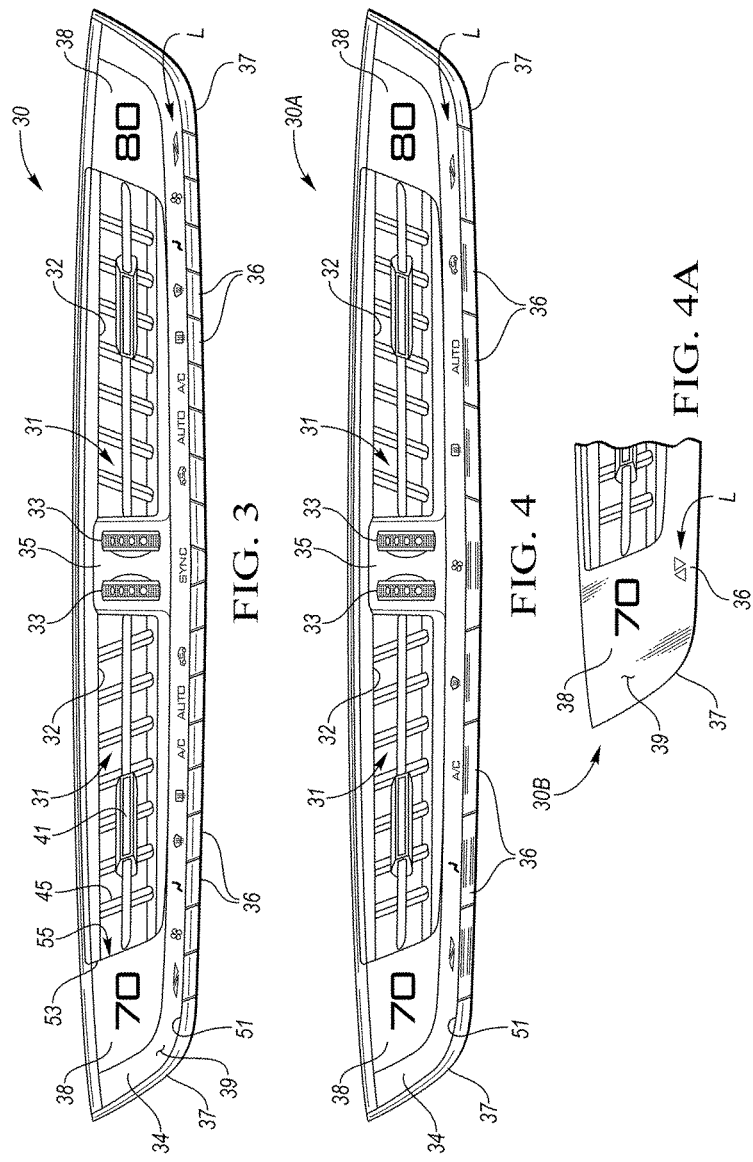

AIR VENT ASSEMBLY WITH INTEGRAL AIR VENT AND CONTROL HEAD

TECHNICAL FIELD

The present disclosure pertains to a vehicle air vent assembly having an integral air vent and control head.

BACKGROUND

Modern passenger vehicles include a heating, ventilation, and air conditioning (HVAC) system that allows a vehicle occupant to control the temperature or adjust other settings of a vehicle interior. For instance, a motor-driven fan or blower circulates conditioned air to the vehicle interior. Some vehicles are equipped with heated and/or cooled seats, a heated steering wheel, and other features that collectively improve overall drive comfort. A typical HVAC system includes front and rear defrosters for improving visibility through the windshield and rear window, respectively. An occupant of the vehicle selects desired HVAC system settings using dials, knobs, push-buttons, touch screens, and/or other HVAC setting selection mechanisms.

SUMMARY

An assembly is disclosed herein that includes an air vent and a heating, ventilation, and air conditioning (HVAC) control head. The assembly may include a controller, e.g., an HVAC control module, in some embodiments. The HVAC control head and the air vent form an integral unit. That is, the HVAC control head is positioned immediately adjacent to the air vent, and may at least partially surround the air vent. The integral air vent and HVAC control head may be positioned within a center stack of a vehicle interior to help free up additional space within the center stack for other control devices, a larger navigation system touch screen, and/or other desired center stack structure.

The air vent, which is in fluid communication with an air circulation device such as a fan or blower, is configured to direct a supply of air from the air circulation device into the vehicle interior. An optional bezel may be included along an underside or lower edge of the air vent as viewed from a typical forward driving perspective. The HVAC control head includes multiple HVAC setting selection mechanisms, i.e., any suitably configured human-machine interface (HMI) control input devices such as buttons, touch screens, toggle devices, or the like, each controlling a setting of a different HVAC function. When the optional bezel is used, such HVAC setting selection mechanisms may be arranged along an outer edge or perimeter surface of the bezel, hereinafter referred to as a perimeter edge. Activation of a respective one of the HVAC setting selection mechanisms causes a corresponding HVAC control signal to be communicated to the controller to thereby request a desired control setting of the HVAC system.

In another example embodiment, an assembly is disclosed for a vehicle having an HVAC system. The assembly includes an air vent in fluid communication with the HVAC system, a controller operable for controlling the HVAC system, and an HVAC control head at least partially surrounding the air vent. The HVAC control head includes HVAC setting selection mechanisms each configured to communicate a signal to the controller that corresponds to a desired setting of the HVAC system. The controller is configured to transmit a corresponding HVAC control setting signal to the HVAC system, with the transmitted signal corresponding to the desired setting.

A vehicle is also disclosed herein that includes a body defining the vehicle interior. The vehicle includes an air circulation device, a controller, and the air vent assembly as noted above.

The air vent assembly may include a pair of side-by side air vents in fluid communication with the air circulation device. The air vent assembly may include a pair of secondary display screens, each of which is positioned at opposite ends of the pair of air vents such that the secondary display screens flank the air vents. The HVAC control head in this particular embodiment includes a plurality of the HVAC selection setting mechanism noted above. Activation of a respective HVAC selection setting mechanism causes a corresponding HVAC control setting signal to be communicated to the controller, which in turn requests a corresponding control setting of the HVAC system.

The HVAC control head may include descriptive labels or icons each corresponding to a function of a corresponding one of the HVAC control buttons. In an example embodiment, a bezel may frame the vent(s) adjacent to the HVAC selection setting mechanisms, with the labels or icons being provided on a surface of the bezel.

The above and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a schematic plan view illustration of an alternative embodiment of the air vent assembly of FIG. 2.

FIG. 4 is a schematic plan view illustration of another possible embodiment of the air vent assembly shown in FIGS. 2 and 3.

FIG. 4A is a partial schematic plan view illustration of a touch screen embodiment of the air vent assembly shown in FIGS. 3 and 4.

DETAILED DESCRIPTION

Figure 1:
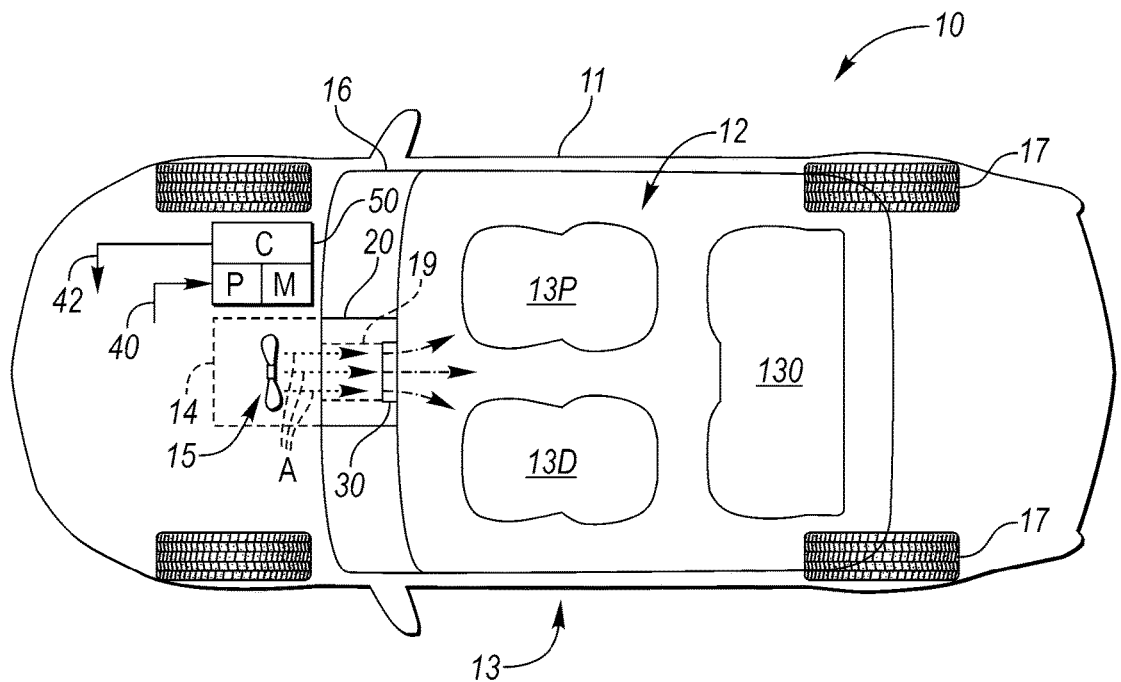
FIG. 1 is a schematic plan view illustration of an example vehicle having an air vent assembly as described in the present disclosure.

Referring to the drawings, wherein like reference numbers refer to the same or similar components throughout the several views, an example vehicle 10 is shown in FIG. 1 having an air vent assembly 30. As described in detail below with reference to FIGS. 3, 4, and 4A, the air vent assembly 30 includes an integral air vent 32 and heating, ventilation, and air conditioning (HVAC) control head 37. The vehicle 10 of FIG. 1 includes a vehicle body 11 positioned with respect to a set of wheels 17, with the vehicle body 11 defining a vehicle interior 12, i.e., a passenger compartment or cabin.

Figure 2:
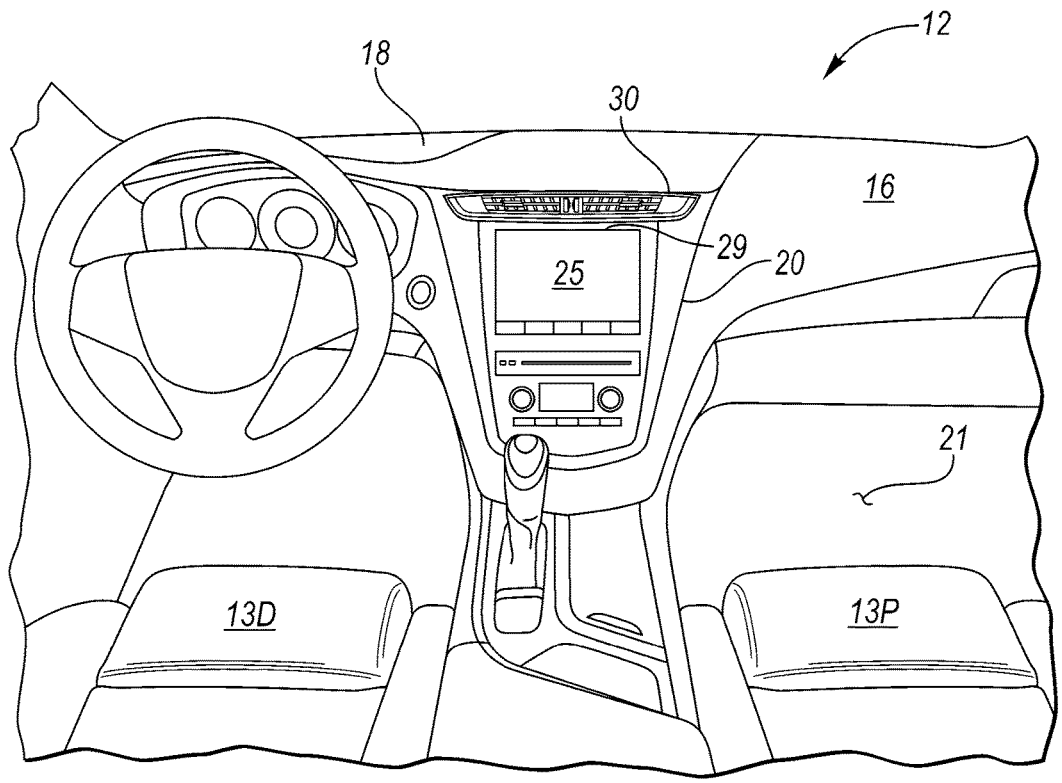
FIG. 2 is a perspective view illustration of an example vehicle interior having a center stack containing an embodiment of the air vent assembly of FIG. 1.

Within the vehicle interior 12 is positioned at least one row of seats, which is depicted in FIG. 1 as example respective first and second row of seats 13 and 130. The first row of seats 13 may include respective driver-side and passenger-side seats 13D and 13P as shown. Other seating configurations may be envisioned without departing from the intended inventive scope, including only the first row of seats 13, bench-style seats or bucket seats in either row of seats 13 and 130, or an additional row of seats (not shown). A possible configuration and placement of the air vent assembly 30 is shown in FIG. 2. Example embodiments of the air vent assembly 30 are depicted in FIGS. 3, 4, and 4A.

The air vent assembly 30 of FIG. 1 may be optionally positioned within a center stack 20 of the vehicle interior 12 adjacent to a dashboard 16. In other embodiments the air vent assembly 30 may be positioned with respect to the rear row of seats 130, such as between the front row of seats 13 and the rear row of seats 130 and/or adjacent the rear row of seats 130. For example, the rear row of seats 130 may be divided into separate seating areas by an arm rest (not shown) or other structure, with the air vent assembly 30 positioned within or adjacent to such structure.

The air vent assembly 30 is in communication with an HVAC system 14 having an air circulation device 15, for instance a motor-driven fan or blower, and with a controller (C) 50. The air vent assembly 30 and the controller 50 together may form a higher level assembly in some embodiments. The HVAC system 14 receives HVAC control setting signal (arrow 42) from the controller 50 in response to user-selected desired settings (arrow 40) of the HVAC system 14. In response to the received HVAC control setting signal (arrow 42) from the controller 50, the HVAC system 14 circulates ambient, heated, or cooled air (arrows A) into the vehicle interior 12, for instance through a duct 19 and the air vent assembly 30. In embodiments in which the air vent assembly 30 is used in proximity to the rear row of seats 130, the duct 19 may be extended beyond the front row of seats 13 such that the duct 19 supplies the air (arrows A) to the air vent assembly 30 wherever the air vent assembly 30 is positioned within the vehicle interior 12.

The controller 50 of FIG. 1 may be a human-machine interface controller, a vehicle body control module, a dedicated HVAC control module, and/or any other suitable computer-based device programmed to control operation of the HVAC system 14 as set forth herein. The controller 50 includes a processor (P) and memory (M), the latter possibly including but not necessarily limited to optical or magnetic read only memory (ROM), flash memory, random access memory (RAM), electrically-programmable read-only memory (EPROM), and the like. The controller 50 further includes electrical circuitry including but not limited to a high-speed clock, analog-to-digital (A/D) circuitry, digital-to-analog (D/A) circuitry, a digital signal processor or DSP, and the necessary input/output (I/O) devices and other signal conditioning and/or buffer circuitry.

Referring to FIG. 2, which depicts a possible configuration of the vehicle interior 12, the air vent assembly 30 is shown positioned within the center stack 20. As is well known in the art, a center stack is a control console positioned between the driver-side seat 13D and the passenger-side seat 13P, typically extending from the dashboard 16 toward a floor 21 of the vehicle interior 12. The design disclosed herein allows an occupant of the vehicle 10 of FIG. 1, when positioned facing outward toward a roadway through a windshield 18 in a normal forward-looking driving position, to view the air vent assembly 30 within the occupant's peripheral vision, such as within about 30 to 40 degrees of a driver's normal/straight-ahead driving focal point. Such positioning may enable the driver/occupant to focus on the roadway while adjusting HVAC settings, unlike conventional designs which require the driver to look to the lower portion of the center stack 20 for accessing HVAC controls.

The vehicle interior 12 of FIG. 2 may include a main display screen 25 as part of the center stack 20. As is known in the art, such a main display screen 25 may be used as part of a vehicle navigation system to display maps or driving directions or other vehicle information. The main display screen 25 can also display vehicle information such as current VAC settings, radio station settings, DVD/CD/MP3 selection options, and the like. The main display screen 25 may be embodied as touch screen device for receiving user selections for the HVAC system 14 and any onboard "infotainment" systems. The controller 50 may be programmed to display the desired settings (arrow 40 of FIG. 1) of the HVAC system 14 via the main display screen 25 and/or via the air vent assembly 30 to provide visual feedback to the occupant as to the current HVAC settings.

In the embodiment of FIG. 2, the air vent assembly 30 is positioned between the windshield 18 and the main display screen 25, i.e., adjacent to or along the top edge 29 of the main display screen 25 as viewed from the normal forward-looking driving perspective of an operator of the vehicle 10. However, as noted above the air vent assembly 30 may also be positioned elsewhere in the vehicle interior 12 without departing from the intended inventive scope. Placement of the air vent assembly 30, regardless of the embodiment, should be in sufficiently close proximity to an occupant, whether a driver or a front/rear seat passenger of the vehicle 10 of FIG. 1, to whom control of HVAC settings is to be provided such that the occupant can comfortably reach the air vent assembly 30 from a seated position.

Referring to FIG. 3, the air vent assembly 30 includes at least one air vent 32. The air vent 32 may be a single air vent or, as shown in FIGS. 2-4, a pair of identically configured, side-by-side air vents 32. The actual shape of the air vent 32 and/or the air vent assembly 30 may vary with the intended design. For example, the air vent 32 and/or air vent assembly 30 may have an elongated, generally trapezoidal shape as shown, or the shape may be rectangular, circular, oval, or any other desired shape. The generally trapezoidal shape of FIGS. 2-4 will be described hereinafter or illustrative consistency.

The air vent 32 is in fluid communication with the air circulation device 15 of FIG. 1 such that the air (arrows A of FIG. 1) enters the vehicle interior 12 through variable openings 31 in the air vent 32. The direction of airflow and degree of opening/closing of the openings 31 may be selected by the occupant of the vehicle 10 of FIG. 1. Depending on the design, such control may be manually achieved via dials 33 arranged on a vent control panel 35 as shown and/or via a tab 41 connected to a plurality of slats 45 defining the openings 31. As is known in the art, lateral movement of the tab 41 changes the degree of opening and/or an angle of the louvers 45.

The air vent assembly 30 also includes the HVAC control head 37 which at least partially surrounds the air vent 32. As used herein, the term "at least partially surrounds" means that a perimeter edge 55 of the air vent 32 abuts the HVAC control head 37, i.e., with zero space or minimal intervening space, for instance less than a 1-2 centimeters of intervening space, and wraps at least partially around the air vent 32. An inner perimeter edge 53 of the HVAC control head 37 may define an opening within which the air vent 32 is disposed, an embodiment shown in FIGS. 3 and 4, such that the HVAC control head 37 fully or partially surrounds the air vent 32.

The HVAC control head 37 in the example embodiment of FIG. 3 may include an optional bezel 34 and a plurality of HVAC setting selection mechanisms 36, i.e., human-machine control input devices. Activation of a respective one of the HVAC setting selection mechanisms 36 causes a desired setting of the HVAC system 14, as indicated schematically by arrow 40 of FIG. 1, to be communicated to the controller 50 to thereby request transmission by the controller 50 of a corresponding HVAC control setting signal (arrow 42) to the HVAC system 14.

When the optional bezel 34 is used, the HVAC setting selection mechanisms 36 may be arranged along or adjacent to a perimeter edge 51 of the bezel 34 as best shown in FIGS. 3 and 4. The bezel 34 may act as a static portion of the HVAC control head 37, i.e., a non-actuated part. Other embodiments may be envisioned within the intended inventive scope such as touch screen options with or without the bezel 34, an example of which is shown in FIG. 4A and discussed below.

Activation of a respective one of the HVAC setting selection mechanisms 36, e.g., by toggling, capacitive sensing, touch, force/depression, or the like, causes the desired settings (arrow 40) of the HVAC system 14 to be communicated to the controller 50 as noted above. As is known in the art, a toggle is any switch or input device operable for moving in two directions, such as up and down. Such toggle devices may be mechanical, optical, or capacitive in different embodiments. Movement of any of the HVAC setting selection mechanisms 36 configured as such a toggle causes the corresponding desired settings (arrow 40) to be communicated in increasing or decreasing directions to the controller 50 of FIG. 1 to allow a given HVAC setting to increase or decrease in discrete increments.

The embodiment of FIG. 3 depicts a design suitable for providing optional dual-zone HVAC control within the vehicle interior 12 of FIG. 2 or another vehicle interior. The HVAC setting selection mechanisms 36 in this instance include two identically-configured sets of HVAC setting selection mechanisms 36 positioned side-by-side on opposite sides of the air vent assembly 30, with each of the HVAC setting selection mechanisms 36 controlling a respective one of the side-by-side air vents 32. Such an arrangement allows the HVAC settings to be separately selectable by a driver and a passenger of the vehicle 10 of FIG. 1.

The HVAC control head 37 may also include one or more secondary display screens 38 each in communication with the controller 50 of FIG. 1. The secondary display screens 38 are secondary in the sense that their physical size is less than that of the main display screen 25 of FIG. 2, which thus acts as a primary screen. In various embodiments, the secondary display screens 28 may be configured to display HVAC-related information. For instance, the secondary display screens 28 may display any of the desired settings (arrow 40 of FIG. 1), such as a corresponding cabin temperature setting.

The HVAC setting selection mechanisms 36 individually control such HVAC settings as blower/fan speed, seat heating/cooling, front and rear defrost, air conditioning (AC) on/off, maximum air/recirculation, and a "sync" button for quickly synchronizing driver and passenger-side controls, i.e., temporarily preventing a passenger from controlling the HVAC settings. The HVAC control head 37 may include descriptive icons or labels (arrow L) each corresponding to and positioned adjacent to a different one of the HVAC setting selection mechanisms 36 so as to clearly indicate the particular HVAC setting controlled by a particular HVAC setting selection mechanism 36. Such icons or labels (arrow L) may be, for examples, embossed, molded, printed, laser etched, and/or painted onto the bezel 34 if used or on the HVAC setting selection mechanisms 36 depending on the embodiment.

An alternative "reduced content" embodiment of the air vent assembly 30 of FIG. 2 is shown as air vent assembly 30A in FIG. 4. In terms of reduced content, this term refers to a reduction in the number of HVAC setting selection mechanisms 36 with respect to the previously described embodiment of FIG. 3. For instance, only one HVAC setting selection mechanism 36 may be used for each HVAC function being controlled. A passenger and driver may individually increase or decrease cabin temperature on their respective sides of the vehicle interior 12 while other HVAC functions are controlled in common. A benefit of the alternative design of FIG. 4 is a reduced number of HVAC setting selection mechanisms 36, which in turn may enable use of larger HVAC setting selection mechanisms 36 for a given air vent assembly 30.

Another possible embodiment of the air vent assemblies 30 and 30A of respective FIGS. 3 and 4 is shown in FIG. 4A. In this design, the entirety of the HVAC control head 37 is constructed of touch-sensitive material to thereby form a touch screen similar to that of the main display 25 of FIG. 2. That is, rather than simply displaying information, the secondary display screens 28 may include a touch control surface 39, e.g., a resistive, capacitive, or surface and acoustic wave/transducer design of the types well known in the art. An icon or label (arrow L) for the corresponding HVAC function may be displayed via the secondary display screen 28. An occupant of the vehicle 10 of FIG. 1 selects the corresponding HVAC function simply by touching the touch control surface 39 on or in close proximity to the displayed icon or label (arrow L). Such a design may be used in conjunction with or in lieu of mechanical buttons, toggles, knobs, or the like.

By way of example, a touch-only interface maybe envisioned in which an occupant, upon touching a particular icon or label (arrow L) to select the corresponding HVAC function, then swipes the touch control surface 39, or alternatively a surface of the main screen 25 or an additional touch screen in the vehicle interior 12 of FIG. 2, in a particular direction to increase/decrease the setting. While omitted from the Figures for clarity, such an additional touch screen could be placed in proximity to the occupant, such as on the vent control panel 35 of FIGS. 3 and 4. Additional space could be freed for this purpose by eliminating the dials 33 and assigning all functions of the dials 33 to the tab 41 of each air vent 32.

While the best modes for carrying out the present disclosure have been described in detail, those familiar with the art to which the disclosure relates will recognize various alternative designs and embodiments within the scope of the appended claims.

The invention claimed is:

1. A vehicle comprising:
a vehicle body defining a vehicle interior with a passenger compartment;
a heating, ventilation, and air conditioning (HVAC) system having an air circulation device;
a controller configured to: receive desired setting signals of the HVAC system, and transmit corresponding HVAC control setting signals to the HVAC system to control operation of the HVAC system responsive to receiving the desired setting signals, wherein each of the HVAC control setting signals corresponds to a respective one of the received desired setting signals; and
an air vent assembly having:
a pair of side-by-side air vents in fluid communication with the air circulation device, wherein each of the air vents is configured to direct a supply of air from the air circulation device into the passenger compartment; and an HVAC control head with an inner perimeter edge defining an opening receiving therein and surrounding both of the air vents, wherein the HVAC control head includes an outer perimeter edge and a plurality of HVAC setting selection mechanisms aligned along the outer perimeter edge, wherein an activation of a respective one of the HVAC setting selection mechanisms causes a respective desired setting signal to be communicated to the controller to thereby request transmission, via the controller, of the corresponding HVAC control setting signal to the HVAC system, and wherein the HVAC setting selection mechanisms include two sets of HVAC control buttons positioned side-by-side along the outer perimeter edge, each of the sets of HVAC control buttons being operable to control output of a respective one of the side-by-side air vents.

2. The vehicle of claim 1, wherein the HVAC control head includes a plurality of descriptive labels or icons each corresponding to a function of a respective one of the HVAC setting selection mechanisms.

3. The vehicle of claim 1, wherein the HVAC control head includes a pair of secondary display screens each in communication with the controller and operable to display the HVAC settings.

4. The vehicle of claim 1, wherein the two sets of HVAC control buttons include two identically-configured sets of HVAC control buttons.

5. The vehicle of claim 1, wherein one of the HVAC setting selection mechanisms is a toggle operable for moving in a first direction to cause the corresponding HVAC control signal to be increased, and in a second direction, to cause the corresponding HVAC control setting signal to be decreased.

6. The vehicle of claim 1, wherein the vehicle includes a center stack having a main display screen in communication with the controller, and wherein the controller is programmed to display the requested HVAC setting via the main display screen.

7. The vehicle of claim 6, wherein the vehicle includes a dashboard, and wherein the air vent assembly is positioned in a center stack between the dashboard and the main display screen.

8. An air vent assembly for use in a vehicle having a controller, a vehicle compartment, and a heating, ventilation, and air conditioning (HVAC) system that includes an air circulation device, the air vent assembly comprising:

a pair of side-by-side air vents each configured to fluidly communicate with the air circulation device of the HVAC system and direct air received therefrom to the vehicle compartment; and an HVAC control head having a bezel, a pair of secondary display screens each configured to communicate with the controller and flanking the air vents, and a plurality of HVAC setting selection mechanisms positioned along an outer perimeter edge of the bezel, the bezel including an inner perimeter edge defining an opening receiving therein and surrounding both of the air vents, wherein an activation of a respective one of the HVAC setting selection mechanisms causes a desired setting signal of the HVAC system to be communicated to the controller to thereby request transmission, by the controller, of a corresponding HVAC control setting signal to the HVAC system to control an operation of the HVAC system and a display of the corresponding desired setting via at least one of the pair of secondary display screens, and wherein the plurality of HVAC setting selection mechanisms includes two sets of HVAC control buttons positioned side-by-side along the outer perimeter edge of the bezel, each of the sets of HVAC control buttons being operable to control output of a respective one of the side-by-side air vents.

9. The air vent assembly of claim 8, wherein at least one of the HVAC setting selection mechanisms is a toggle operable for moving in a first direction to cause the corresponding HVAC control signal to be increased and in a second direction to cause the corresponding HVAC control signal to be decreased.

10. The air vent assembly of claim 8, wherein the HVAC control head includes a touch screen device having a touch control surface, and wherein the HVAC control head is operable for displaying at least some of the HVAC setting selection mechanisms via the touch control surface.

11. The air vent assembly of claim 8, wherein the HVAC control head is a touch screen device with a touch control surface operable for displaying all of the HVAC setting selection mechanisms.

12. The air vent assembly of claim 8, wherein the bezel includes a plurality of labels and/or icons, each of the labels and/or icons identifying a corresponding one of the HVAC setting selection mechanisms.

13. The air vent assembly of claim 8, wherein the HVAC control buttons are arranged side-by-side in series along the outer perimeter edge of the bezel.

* * * * *